Patented July 28, 1931

1,816,128

UNITED STATES PATENT OFFICE

FRITZ SEEBACH, OF ERKNER, NEAR BERLIN, GERMANY, ASSIGNOR TO BAKELITE GESELLSCHAFT MIT BESCHRANKTER HAFTUNG, OF BERLIN-CHARLOTTENBURG, GERMANY

HARDENABLE OIL VARNISH AND METHOD OF PREPARING SAME

No Drawing. Application filed June 8, 1928, Serial No. 284,011, and in Germany June 28, 1927.

It is known that phenol-formaldehyde condensation products, with few exceptions, do not possess the property of dissolving in fatty oils, such for example, as linseed oil, china wood oil, or varnishes made therefrom. Only in a few of the intermediate stages of phenol-formaldehyde condensation products, or phenol-acetaldehyde condensation products, is the property of dissolving in oils or varnishes developed, but those particular synthetic resins which possess oil solubility are not hardenable, that is to say, they are not transformable into hard and infusible resinoids by application of heat. It has been proposed to obtain an air-drying varnish by condensing wood oil, cresol and methylene containing substances and to produce from phenols and air-drying oils a so-called "phenol-oil" and to dissolve the same in a solvent together with hardening agents, and to disperse phenolic resins in an indifferent liquid by means of high speed mills, until a colloidal suspension is obtained.

In accordance with the present invention it is possible to bring about a combination of drying oils or varnishes, with hardenable synthetic resins.

Until the present, all efforts made to accomplish this result have been unsuccessful. Whenever it was attempted to bring hardenable (reactive) synthetic resins into solution in fatty oils or oil varnishes by boiling, the synthetic resin was quickly transformed thereby into the infusible condition. Even when some solution was accomplished, the dissolved portion was in such a worthless state that efforts to harden the coatings prepared therewith were fruitless.

It is possible to attempt the formation of hardenable artificial resins from their components (for example phenol and formaldehyde) in fatty oils or varnishes, obtaining thereby a condensation up to a certain point without causing a separation to occur. It is not possible however to carry this reaction to a practicable extent, since there is always the danger that the condensation products thus formed will not remain in solution because these condensation products as they increase in molecular dimensions become progressively less soluble in fatty oils or varnishes.

If the condensation in oils is carried only to the point where the condensation product has not become completely insoluble in fatty oils, coatings are obtained which air dry and which moreover may be further hardened by heating. Such coatings require however an inconveniently long time for drying, and they also, when further hardened by heating, tend to give off considerable quantities of volatile substances such as water, free phenol and formaldehyde.

These several disadvantages are obviated by the present invention, which is based upon the surprising observation that the phenol-aldehyde resins of the reactive or hardenable type enter readily into combination (apparently a chemical combination) when heated with fatty oils or vanishes prepared therefom which have been subjected to an oxidation process, in which process the peroxide oxygen of the treated oil appears to be the essential factor in effecting the combination of the fatty oils with the synthetic resin.

The technical possibilities for utilizing this effect are many. Above all, the great advantage in the present method lies in the possibility which it affords for limiting the volatile components in the production of the novel varnishes or lacquers. In fact, such volatile components may be completely eliminated. This is of the greatest technical importance, especially insofar as the covering power of the new lacquers is concerned. The loss in weight in the drying of these new lacquers is reduced to a minimum; and in fact, the coatings may show an actual gain in weight during this air driving process.

With a view to complete elimination of solvents, the preparation by purely mechanical means of an emulsion of hardenable artificial resin in an air drying fatty oil varnish may be accomplished by grinding the linseed oil or equivalent drying oil varnish with a powdered synthetic resin in a ball mill until no particles are perceptible between the fingers. A colloid mill may also be employed. It appears that the synthetic resin is readily transformed into the colloidal condition in oils or varnishes, since the treatment in the ball mill alone furnishes such fine suspensions of resin in oil that no further sedimentation takes place even after diluting with the usual varnish diluents. All kinds of reactive or hardenable synthetic resins may be employed, ordinary synthetic resins as well, for example, as such pure synthetic resins as may be produced in accordance with the German patents Nos. 431,514, 432,202, 432,203, and 432,727. The latter resins are more readily, more quickly, and more widely dispersable: the present method however is not limited to these particular resins.

The coatings produced with these colloidal resin solutions in fatty oils or varnishes dry very rapidly even in thick layers, even more rapidly than the pure varnishes or oils; so that it appears that there is a catalytic acceleration of the rate of drying of these varnishes which is caused by the presence of the finely comminuted resin. Especially the pure artificial resins of the above mentioned German patents produce this singular effect, as owing to their fine comminution they are able to condense on their large exposed surface great quantities of oxygen absorbed from the air. This is another important effect which is technically of great significance.

Non-reactive phenolic resins to which a hardening agent has been added in any appropriate way to produce a potentially reactive composition may similarly be comminuted in varnishes. Also mixtures of different resins are applicable.

It is sometimes advantageous to add 5 to 10 parts by weight (based on the resin) of organic solvents such as hexalin, acetone and the like which have a swelling action upon the resin or which otherwise assist in obtaining or retaining the fine comminution.

As regards the fatty oils to be employed, linseed oil and linseed oil varnish, wood oil and other air drying oils are preferred. Also preheated oils may be used, as for example "Standoil", "Uvioloil" and similar products. Also mixtures of the different oils may be used. Before combining the oils with the hardenable resins it is sometimes advantageous to add other resins which readily dissolve in the oils, as for example, colophony, the artificial resin from ortho-cresol, other oil-soluble artificial resins, etc., and then to bring about the comminution of the hardenable synthetic resin in the resulting resin lacquers by treating them further in the manner described above.

Air, or air-containing ozone, may be forced through the finished lacquers by means of fine nozzles at normal or slightly higher temperatures, for example, 30 to 50° C.

After air drying, the coatings are exposed for a shorter or longer period to a temperature of about 120–140° C., thus causing a chemical combination of the air-oxidized varnish with the hardenable resin to take place. The coatings which at first are opaque become clear, transparent and glossy under this treatment. They are characterized by great elasticity and adhesive power as well as by their resistance to chemical attack. By using suitable supports, as for example glass plates, and employing a special treatment of the hardenable coatings, as for instance by dipping in concentrated aqueous ammonia, a removable elastic film which may be used in many ways may be produced. The advantage of the present films over those prepared from oil alone lies principally in the increased resistance of the coatings or films against mechanical and chemical action.

In general, the new lacquers containing hardenable resins may find wide application. They possess impregnating properties to an extraordinary degree.

As a modified procedure a coating of air drying fatty oil alone may be applied, and then dusted over the dry dust-like powder of the hardenable synthetic resin, using as much of the resin as the coating is able to absorb and heating thereafter to bring about the combination. One may also apply a second coat with the new lacquer on the pure air-drying oil coating.

Example I 5 kilograms pulverized reactive phenol-methylene resin (softening point about 120° C.) preferably purified according to one of the above-mentioned patents, are treated with 10 kilograms of linseed oil varnish in a ball mill or in an ordinary pigment mill until the resin particles show the molecular movement of colloid particles under the ultramicroscope. The varnish may be diluted with benzol, oil of turpentine, benzene or the like without causing sedimentation of the particles.

Example II 5 kilograms of non-reactive phenol-methylene resin which has been stirred, kneaded or mixed with an appropriate quantity of hardening agents (for example 10% by weight of hexamethylenetetramine) is worked up with 10 kilograms of linseed oil varnish in a color mill. After a short time a colloidal resin varnish system is produced.

Example III

According to Example I, 5 kilograms of ordinary reactive synthetic resin powder (in the so-called A condition) are compounded with 10 kilograms of linseed oil varnish until the colloidal condition is reached.

The combining power of phenol resins with varnishes is not however limited to the so-called A condition of the resins. Synthetic phenolmethylene resins which are in the insoluble condition but capable of swelling (so-called B condition) or even in the fully hardened condition may be heated in the same manner in accordance with the examples mentioned. Even fully hardened resin material is still sufficiently reactive to unite with oil varnishes which dry by means of peroxide oxygen.

*Example IV*

1 part of finely ground phenol-methylene resin is finely comminuted with 2 parts of linseed oil varnish.

*Example V*

The hardened synthetic resin before finely comminuting in fatty oils may be subjected to a chemical treatment. For example, 1 part of hardened phenol-methylene resin into which nitro-groups have been introduced (for example, by digesting the powdery synthetic resin with dilute nitric acid and then washing the nitro product to neutrality) is treated with linseed oil in accordance with Example IV. The coatings dry quickly.

*Example VI*

One may also apply synthetic resin in the so-called B condition and proceed in accordance with Example IV. After fine comminution is obtained a few percent (for example 5%) of a swelling agent, as for instance, acetone, may be added to the artificial resin.

I claim:

1. In a method of preparing hardenable oil varnishes, the step comprising grinding an air-drying fatty oil with a reactive phenol-methylene resin until no particles are perceptible between the fingers.

2. In a method of preparing hardenable oil varnishes, the step comprising grinding an air-drying fatty oil with a reactive phenol-methylene resin until no particles are perceptible between the fingers, and oxidizing the resulting mixture.

3. In a method of preparing hardenable oil varnishes, the step comprising grinding China wood oil with a reactive phenol-methylene resin until no particles are perceptible between the fingers.

4. A hardenable oil varnish resulting from grinding an air-drying oil with a reactive phenol-methylene resin until no particles are perceptible between the fingers.

In testimony whereof I affix my signature.

FRITZ SEEBACH.